(12) United States Patent
Idaka

(10) Patent No.: US 6,254,800 B1
(45) Date of Patent: Jul. 3, 2001

(54) WATER PURIFICANT

(76) Inventor: Eiichi Idaka, 1735-133 Kano, Gifu 501-31 (JP)

( * ) Notice: Subject to any disclaimer, the term of this patent is extended or adjusted under 35 U.S.C. 154(b) by 0 days.

(21) Appl. No.: 08/897,772

(22) Filed: Jul. 21, 1997

(51) Int. Cl.⁷ .................................. C02F 5/02; C02F 5/08
(52) U.S. Cl. ........................ 252/175; 252/180; 252/181
(58) Field of Search ..................... 252/175, 180, 252/181

(56) References Cited

U.S. PATENT DOCUMENTS 5,302,307 * 4/1994 Ireland ................................. 252/70

FOREIGN PATENT DOCUMENTS

| H7-34728 | 2/1992 | (JP) . |
| 96111187 * | 4/1996 | (JP) . |
| WO 9605142 * | 2/1996 | (WO) . |

OTHER PUBLICATIONS

David Freifelder (Translated by M. Kawakita into Japanese), Introduction to molecular biology, pp2, (1985) Tokyo Kagaku Dojin, Tokyo.
Thomas D. Brock, Biology of microorganisms, (1970), Prentice–Hall, Inc., New Jersey.
I.Horiuchi, E. Idaka, S. Komura, Advanced biotechnical treatment of water in intensive prawn culture system, 19th Congress on Science and Technology of Thailand, pp89–90, (Oct., 27–29, 1993, Dusit J. B. Hotel, Hat Yai, Songkhla, Thailand).
E. Epstein, Mineral nutrition of plants: Principles and perspectives, pp292–322, (1972), John Willy and Sons, Inc., New York.
Ed. by F. E. Brear, Chemistry of the soil, (1969), Van Nostrand Reinhold Co., New York.
R. Sudo, Biology of Wastewater Treatment, pp311, Sangyo Yosui Chosakai, Tokyo, Japan (1977).
Ed. by Soc. Civil Engineering, Sanitary Engineering Commity, Research Methods for Environmental Sanitary Engineering, Gihodo Shuppan, Tokyo, Japan (1993).
Ed. by M. Watanabe, K. Harada, H. Fujiki, Water–bloom, Appearance and Toxicity, Tokyo University Shuppankai, Tokyo, Japan (1994).
T. Saegusa, Nematode, Nobunkyo, Tokyo, Japan (1993).
C. J. Sindermann, D. V. Lightner ed., Developments in North American Marine aquaculture, Elsevier, Amsterdam, (1988).
Chi Changrok, Specific minerals for cancer, Gendai Shorin, Tokyo, Japan (1991).
B. H. McConnaughey, Introduction to marine biology, 10, (1970), The C. V. Mosby Co., St Louis.
E. Idaka et al., Degradation of azo compounds by Aeromonus hydrophila var. 24B, J. Soc. Dyers Colour., vol. 94, pp91–94, (1978).
E. Idaka et al., Structure of zebrinin, a novel acylated anthocyanin isolated from *Zebrina pendula*, Tetrahedron Lett., vol. 28 (17), pp1901–1904 (1987).
E. Idaka et al., Application of aerated bio shelf purification to ponds and lakes, Research Report of Center for Cooperative Research, Gifu University, (2), pp62–69, (1992).
E. Idaka et al., Biotechnical purification of rivers and lakes, Proceedings of Multi–nature type–river environment creation Symposium, pp18–31, (1992), organized by River front Arrangement Center, Dam Source Environment Arrangement Center, Gifu University, Gifu Prefecture Government (Gifu).
I. Horiuchi, E. Idaka et al., Water Treatment Method in Prawn Culture Ponds through Modern Technology, (Thailand–Japan Bilateral Seminar on Water Treatment Method in Prawn Culture Ponds through Modern Technology, Sep. 30, 1992. Eastern Hotel, Chantabuli, Thailand, Organized by Ministry of Agriculture and Cooperatives, Bank of Ayudhaya).

* cited by examiner

Primary Examiner—Margaret Medley
Assistant Examiner—Cephia D. Toomer
(74) Attorney, Agent, or Firm—Van Metre Lund

(57) ABSTRACT

The object of the invention is to provide a water purificant effecting as optimum media for microorganisms in hydrosphere and pedosphere and increasing the diversity of microorganisms, fishes, plants and animals. The feature of this invention is comprised of 1 ppm–100% of bittern and acids or bases and/or salts.

9 Claims, No Drawings

WATER PURIFICANT

BACKGROUND OF THE INVENTION

1. Field of the Invention

The present invention relates to a water purificant in the field of aquiculture, agriculture, horticulture, floriculture and waste-water treatment, which are effective as media to cells of microorganisms, fishes, plants and animals in water and soils. The water purificant for the uses of aquaculture, agriculture, horticulture, floriculture and waste-water treatment increase the diversity of microorganisms in water and soils and activate microorganisms, plants, animals, fishes.

2. Description of the Prior Art

The minimal media containing carbon sources, nitrogen sources and minerals (Na, K, Mg and Fe) were well known to grow microorganisms, fishes, plants and animals (References: David Freifelder (Translated by M. Kawakita), Introduction to molecular biology, 2p (1985), Tokyo Kagaku Dojin, Tokyo; Thomas D. Brock, Biology of microorganisms, (1970), Prentice-Hall, Inc., New Jersey).

But, every species of microorganisms, fishes, plants and animals prefer different optimum media, common minimal media can not exist for all species. For example, in the case of microorganisms, there are category of prototroph and auxotroph and their nutritional factors are different.

In the case of growing microorganisms, plants, animals and fishes in hydrosphere and pedosphere, the nutrition in media was consumed in accordance with the nutritional demands of species, and the residual factors in media were concentrated in the broth or soils. The concentrated residues in media produce replant failure or virus disease in plants and fishes. The concentrated residues in media produce replant failure or virus disease in plants and fishes. (Reference: I. Horiuchi, E. Idaka, S. Komura, Advanced biotechnical treatment of water in intensive prawn culture system, 19th Congress on Science and Technology of Thailand, 89p, (27–29, October, 1993, Dusit J. B. Hotel, Hat Yai, Songkhla)).

In the case of minerals, the elements of secondary nutrients (Ca, Mg, Si, S) and micronutrients (Mn, B, Fe, Cu, Zn, Mo, Cl) are so called essential minerals for plant growth (References: E. Epstein, Mineral nutrition of plants: Principles and perspectives, (1972), John Wiley and Sons, Inc., New York; Ed. by F. E. Brear, Chemistry of the soil, (1969), Van Nostrand Reinhold Co., New York). But, so called minerals involved more than 100 kinds of elements and enormous chemical species in which involved stable, metastable, unstable isotopes and their cluster forms. So the true essential minerals can not be supplied by adding bittern from surface marine water.

In the results, the diversity of minerals in hydrosphere and pedosphere decreased, the replant failure by nematode and the annihilation of black tiger prawn (*Penaeus monodon*) occurred and resulting predominant species degradin healthy food chain occurred. The phenomena in accordance with the lack of mineral balance were as follows: 1. Zoogloea bulking in activated sludge treatment (Reference: R. Sudo, Biology of Wastewater Treatment, 311p, Sangyo Yosui Chosakai, Tokyo, Japan (1977); Ed. by Soc. Civil Engineering, Sanitary Engineering Commity, Research Methods for Environmental Sanitary Engineering, Gihodo Shuppan, Tokyo, Japan (1993)); 2. phytoplankton bloom in eutrophic lakes (Reference: Ed. by M. Watanabe, K. Harada, H. Fujiki, Water-bloom, Appearance and Toxicity, Tokyo University Shuppankai, Tokyo, Japan (1994)); 3. Red tide; 4. Cyst nematode in fields (Reference: T. Saegusa, Nematode, Nobunkyo, Tokyo, Japan (1993)); 5. *Bursaphelenchus lignicolus* in stems of Pinaceae; 6. Annihilation of prawn (C. J.Sindermann, D. V.Lightner ed., Developments in Aquaculture and Fisheries Science, 17, Disease Diagnosis and control in North American Marine Aquaculture, Elsevier, Amsterdam, (1988)); 7. Tricoderms sp., Aspergillus sp. and Penicillium sp. in culture of *Agaricus silvaticus* Schaeffer, *Agraricus fiardii* Pegler (*Agaricus blazei* Murrill) and *Cordyceps sinensis* (Berkley) Saccardo; 8. Growth of cancer, atopic dermatitis, pollinosis (Reference: Chi Changrok, Specific minerals for cancer, Gendai Shorin, Tokyo, Japan (1991)).

SUMMARY OF THE INVENTION

In view of the above-described problems, the present inventor made exhaustive studies in order to dissolve the lack of minerals in hydrosphere and pedosphere. The present inventor achieved to this invention in which the inventor treated deep marine water over 200 m depth or from upwelling to collect bittern and after then it was concentrated and treated chemically.

Primeval sea water or soils should contain many kinds of minerals. However, sea water or soils now lack many kinds of minerals and now lack diversity with respect to existing chemical species. Replant failure occurs when large quantities of manure and pesticide have been introduced in sea water or soils. The water purificant of this invention supplies minerals as activated states to cells of microorganisms, fishes, animals and plants. By incorporating minerals in cells, growth and immunity of cells can be increased and then, yields of plants, fishes, microorganisms and hymenocarps must be increased.

An object of the invention is to provide a water purificant that is for use in aquiculture, agriculture, horticulture, floriculture and waste-water treatment and that comprises bittern.

In one embodiment, the purificant includes acids, salts or a combination of acids and salts. Unless otherwise indicated, the word "acids" is used herein and in the claims to mean acids that are either inorganic or organic and the word "salts" is used herein and in the claims to mean salts that are either inorganic or organic. The concentration of bittern is 1 ppm–100 weight %, based upon the total weight of the composition of the purificant, i.e. bittern must exist in the composition. A very important feature is that the bittern of the composition be made or concentrated from deep marine water such as exists 200 meters or more under sea level or bittern of the same character produced from upwells.

The water purificant of another preferred embodiment of the present invention comprises bittern and bases in which case, the bittern may form 1 ppm–100 weight% of the water purificant. Further, according to other preferred embodiments, the water purificant may contain a basic poly-saccharide such as chitin or chitosan, which may form 10–20000 ppm of the water purificant.

Further, according to the preferred embodiments, the bittern solution is made from deep marine water which exists at or more than 200 m below the sea level. In this case, the deep marine bittern solution may form 1 ppm–100 weight % of the water purificant.

The above and further objects, features, aspects, and advantages of the present invention will be more fully apparent from the following detailed description.

DESCRIPTION OF THE PREFERRED EMBODIMENTS

The first preferred embodiment of the water purificant for the uses of aquaculture, agriculture, horticulture, floriculture and waste-water treatment in this invention is obtainable by adding acids and/or salts in bittern concentrated from deep marine water which exists at or more than 200 m below the sea level, or from upwelling water (Reference: B. H. McConnaughey, Introduction to marine biology, 10, (1970), The C. V. Mosby Co., St Louis). For example, the specific gravity of the bittern solution is 1–1.4 g/cm3. In the case of adding these water purificant to hydrosphere or pedosphere under dilution, they activate and increase the diversity of microbiota, fauna and flora.

Also, an ion contained in the water purificant activates and dissolves oxygen.

Also, a mineral ion in the water purificant activates and dissolves oxygen to improve the quality of the water from an environmental standpoint.

The acids and/or salts of the present invention are inorganic acids and/or organic acids and/or inorganic salts and/or organic salts. They can use pure or mixed. The several examples of acids and salts of this invention are as follows: inorganic acids (phosphoric acid, sulphuric acid, nitric acid, hydrochloric acid), inorganic salts (potassium phosphate, magnesium phosphate, ammonium sulphate, calcium sulphate), organic acids (citric acid, succinic acid, acetic acid, itaconic acid, tartaric acid, pyruvic acid, malic acid, fumaric acid, oxalacetic acid, cis-aconitic acid, isocitric acid, oxalosuccinic acid, alpha-ketoglutaric acid, cafferic acid, sinapic acid, coumaric acid, aspartic acid), organic salts (sodium potassium tartarate, sodium acetate, potassium citrate, calcium succinate, magnesium malate), pyroligneous acid.

Concentrations of bittern and acids were as follows: bittern, 5–80%; acids and/or salts, 10–50%. Over or under the concentration alkali water can not neutralized.

Addition of sulphate was effective for water conditioning and otherwise, addition of phosphate, citrate and/or succinate were effective for growth of microorganisms, fishes and plants.

The analyses of the water purificant of this invention by inductively coupled plasma atomic emission spectrometry (Hitachi P-4010) are as follows: Na=37400, K=12400, Mg=44400, S=19800, Br=1620, Sr=18, Nb=0.1, In=0.1, Te<0.1, Pr<0.1, Ge<0.1, Sb<0.1, Pb<0.1, Mn=1.1, Fe<0.1, Ce<0.1, Ga<0.1, Ni<0.1, Nd<0.1, Pd<0.1, Rh<0.1, Hg<0.1, Tb<0.1, Li=18, Er<0.1, Sm<0.1, V<0.1, Cu<0.1, Mo<0.1, Tm<0.1, Zn<0.1, Ho<0.1, La<0.1, Ti<0.1, Ba<0.1, Dy<0.1, Gd<0.1, Co<0.1, Ag<0.1, Zr<0.1, Eu<0.1, Y<0.1, Yb<0.1, Sc<0.1, Cd<0.1 (ppm).

By acute toxicity test (20 ml/kg-weight was administrated orally) to 10 mice (ddy, 5 week old, male, 2 groups) all mice were living.

Standard method analysis of water with 10000 dilution after 24 h at r.t. was as follows: standard plate count=0 count/ml, coliform group=0 count/ml, Cd<0.001 mg/ml, Hg<0.005 mg/l, Se<0.001 mg/l, Pb<0.005 mg/l, Ba<0.1 mg/l, As<0.005 mg, Cr(VI)<0.005 mg/l, CN<0.01 mg/l, NO2+NO=2.6 mg/l, F<0.1 mg/l, H3BO4<1.0 mg/l, Zn<0.005 mg/l, Cu<0.01 mg/l, Mn<0.005 mg/l, organic matter=2.2 mg/l, sulphide<0.05 mg/l. The analytical results come up to the standard mineral water.

Effect of the water purificants of the invention to microorganisms, fishes, plants and animals was as follows:

1. Activate the growth of aerobes and facultative anaerobes in hydrosphere and pedosphere; 2. Coagulate the organic matters and charged particular (charged cells, ion or cluster); 3. Enhance the food chain in hydrosphere and pedosphere; 4. Activate the growth of fishes, plants and animals in hydrosphere and pedosphere; 5. Change the mineral-poor water to the mineral-enriched water; 6. Mineralize bath water by which blood flow activates and skin temperature turns up; 7. Adding rice water, a bulky soft and tasty rice can be made and the initial taste keeps long time (for 2–4 days); 8. By adding to culture pond, purify and keep water quality, inhibit the occurrence of virus, algae and sludge, and then be effective to the healthy growth of prawn, fishes and become enlarged size; 9. Show repellent effect to insect pest; 10. Fishes or shrimps can transport with live by spraying the water purificant; 11. Compost and barnyard manure ferment with good quality; 12. Purify the water of lake, river and marsh; 13. Coagulate and degrade the waste water from processed factory of marine product; 14. Effective for the growth of yeast; 15. Effective for the fermentation of pickles; 16. By adding to lotions activate the metabolisms of skin, hair root cells and root sheath.

Concentrations of bittern and acids were as follows: bittern, 1 ppm–100%; acids, 1 ppm–50%.

In the case of adding the water purificant of the invention, 1000–10000 folds dilution of the formulated concentrate of the water purificant is optimal for environmental water. In the case of water culture, 10000–100000 folds dilution is optimal.

The range of the specific gravity (d) of the bittern concentrated from deep marine water (collected depth over 200 m) of this invention is 1.2–1.4. The activity of the water purificant depends on the specific gravity of the bittern.

In the case of agar culture (with SMY (sucrose-malt extract-yeast extract) media) of Agaricus silvaticus Shaeffer in the range of d=1.2–1.4, the growth rate (mm/day) was as follows: 0.4 mm/day (control), 0.5 mm/day (d=1.2), 0.55 mm/day (d=1.3), 0.62 (d=1.4). Therefore, the activity of the water purificant increased in accordance with heavier specific gravity. In the case of d=1.4, the highest growth activity showed.

In the case of agar culture of Agaricus fiardii Pegler (with SMY media) in the range of d=1.2–1.4, the growth rate (mm/day) was as follows: 0.4 mm/day (control), 0.48 mm/day (d=1.2), 0.53 mm/day (d=1.3), 0.60 (d=1.4). Therefore, the activity of the water purificant increased in accordance with heavier specific gravity. In the case of d=1.4, the highest growth activity showed.

In the case of agar culture of Cordyceps sinensis (Berkley) Saccardo (with SMY media) in the range of d=1.2–1.4, the growth rate (mm/day) was as follows: 0.26 mm/day (control), 0.30 mm/day (d=1.2), 0.35 mm/day (d=1.3), 0.40 (d=1.4). Therefore, the activity of the water purificant increased in accordance with heavier specific gravity. In the case of d=1.4, the highest growth activity showed.

In the case of agar culture of Aeromonas hydrophila var 24B. (with SMY media) in the range of d=1.2–1.4, the growth rate (mm/day) was as follows: 0.24 mm/day (control), 0.3 mm/day (d=1.2), 0.34 mm/day (d=1.3), 0.42 (d=1.4). Therefore, the activity of the water purificant increased in accordance with heavier specific gravity. In the case of d=1.4, the highest growth activity showed (Reference: E. Idaka et al., Degradation of azo compounds by *Aeromonas hydrophila var*. 24B, J. Soc. Dyers Colour. vol.94, 91–94 (1978)).

The stability of zebrinin after 5 days in the range of d=1.2–1.4 at pH 6.5 was as follows:55% (control), 58% (d=1.2), 64% (d=1.3), 68% (d=1.4). In the case of the d=1.4, the highest stability of zebrinin was shown (Reference: E.

Idaka et al., Structure of zebrinin, a novel acylated anthocyanin isolated from *Zebrina pendula*, Tetrahedron Lett., vol.28 (17) 1901–1904 (1987)). The pH range of the water purificant was tested in the range of pH5–pH11. The pH range was prepared with mixed mineral acid solution of phosphoric acid and sulfuric acid (2:1) for acidic range and calcium hydroxide for basic range. In the case of agar culture (with MY media) of *Agaricus silvaticus* Shaeffer in the range of pH5–pH11, the growth rate (mm/day) was as follows: 0.4 mm/day (control), 0.2 mm/day (pH5), 0.3 mm/day (pH6), 0.54 mm/day (pH6.5), 0.50 mm/day (pH7), 0.52 mm/day (pH7.8), 0.48 mm/day (pH8.5), 0.40 mm/day (pH9.2), 0.35 mm/day (pH10.2), 0.2 mm/day (pH11). The optimum pH range was shown in the range of pH6.5–8.5.

Effects of the water purificant of the second preferred embodiment of this invention is similar as above described effects of the first preferred embodiment.

The present invention will be explained more specifically below by way of Examples. However, the present invention is in no way restricted to these Examples.

EXAMPLE 1

Formulated concentrate of the water purificant was prepared by mixing with 3% of bittern, 1% of mixed mineral acid solution (phosphoric acid and sulfuric acid (2:1)), 1% aluminum chloride and 1% of ferric chloride. The solution was diluted 1000–10000 folds and added in the water supplying tank, cooling tower and humidifier. After then, 90% of the growth of legionnaires inhibited.

EXAMPLE 2

Formulated concentrate of the water purificant was prepared by mixing with 10% of bittern and 2% of phosphoric acid. The solution was diluted 1000 folds and sprayed on leaves of vegetables. After then, the vegetables keep life. Generally, by the spraying or dipping to the water purificant, the growth of *E. coli* attached on the leaves of vegetables is inhibited.

EXAMPLE 3

Formulated concentrate of the water purificant was prepared by mixing with 10% of bittern concentrated from deep marine water, and 2% of mineral acids. The solution was diluted 1000 folds and sprayed or infiltrated in soil. In the case of polluted with chlorides (trichloroethylene, tetrachloroethylene, chloroform), the chlorides were selectively degraded by minerals of the water purificant.

EXAMPLE 4

Water-front plants (*Salix subfragilis, Alnus japonica, Ulmus Davidiana, Acer palmatum thunb, Fraxinus mandshurica, Juglans mandshurica, Ilex serrato, Viburnum Opulus L., Hydrangea paniculata, Staphylea Bumald, Carex Thunbeigit, Carex curvicollis Carex dispalata, Scirpus triqueter, Scripus triangulatus, Osmunda cinnamomea, Impatieus noli-tangere, Senecio pierotii, Lythrum anceps, Iris setosa, Phragmites communis, Zizania latifolia, Typha latifolia, Sparganium stoloniferum, Scirpus lacustris L., Nuphar japonicum, Nelumbo nucifera, Acorus calamus L., Iris pseudoacorus L., Meryanthes trifoliata, Trapa natans, Nymphoides peltata, Nymphoides indica, Nymphaea tetragona, Potamogeton destinctus, Euryale ferox, Brasenia Scheberi, Hydrocharis Morsus-ranae, Potamogeton crispus, Potamogeton malaianus, Potamogeton octandrus, Ophiopogon japonicum, Mynophyllum verticillatum, Ranunculus aquatilis, Najas marina, Vallisneria asiatica, Hydrilla verticilleta, Mimosa*) contain a lot of polyphenols, tannins and minerals in their cells. These components and compounds show activity for purifying water environment (References: E. Idaka et al., Application of aerated bio shelf purification to ponds and lakes, Research Report of Center for Cooperative Research, Gifu University, (2), 62–69 (1992), I. Horiuchi, E. Idaka et al., Water Treatment Method in Prawn Culture Ponds through Modern Technology, (Thailand-Japan Bilateral Seminar on Water Treatment Method in Prawn Culture Ponds through Modern Technology. Sep. 30. 1992. Eastern Hotel, Chantabuli, Thailand, organized by Ministry of Agriculture and Cooperatives., Bank of Ayudhya.)). Also, dried-up powder or extracts of water-front plants selected from above described water-front-plants are effective as substrates for growth of Phototrophic bacteria (Chromatiaceae, Rhodospirillaceae) which eliminate toxic compounds and keep respiratory activity of root of *Oryza sativa L.* in paddy fields.

In the case of adding a water purificant which is composed of a water purificant of this invention (mixed solution of 10% of bittern and 2% of mixed mineral acids) and several kinds of powder of the water-front plants selected from above described water-front plants to paddy fields, *Clostridium pectinovorum, Desulfovibrio desulfuricans* and *Erwinia carotovora* were inhibited to grow and growth of roots of *Oryza sativa L.* accelerated. Also, Phototrophic bacteria accelerate the floral formation, so that the yields of rice increased 23%.

EXAMPLE 5

Natural rubber serum powder (NRSP) which was obtained with hydrolysis of latex mother solution by papain is effective for growth of *Bifidobacterium brave*.

Formulated concentrate of the water purificant was prepared by mixing with 3% of bittern concentrated from deep marine water, and 0.5% of potassium hydrogencarbonate. The solution was diluted 1000–10000 folds and added to NRSP. 2.5 folds of cell amount of *Bifidobacterium brave* was harvested with NRSP and the water purificant.

The water purificant of this invention is effective as media supplying minerals for culture of aerobes, anaerobes, facultative anaerobes, plants and mammals.

EXAMPLE 6

Formulated concentrate of the water purificant was prepared by mixing with 10% of bittern concentrated from deep marine water, and 2% of mineral acids. The solution was diluted 1000–10000 folds and added into prawn culture pond for juvenile. The growth and residual rate of juvenile improved and virus-free juvenile was harvested. By addition of the water purificant to prawn culture pond, big size, virus-free prawn was harvested and growth rate and residual rate were improved, respectively. The water purificant is also effective for fishes.

EXAMPLE 7

Formulated concentrate of the water purificant was prepared by mixing with 10% of bittern concentrated from deep marine water, and 2% of mineral acids. The solution was diluted 1000–10000 folds and added into prawn culture pond. Also, boiled aqueous extract or dried-up powder of water-front plants (*Salix subfragilis, Alnus japonica, Ulmus Davidiana, Acer palmatum thunb, Fraxinus mandshurica, Juglans mandshurica, Ilex serrato, Viburnum Opulus L.,*

*Hydrangea paniculata, Staphylea Bumald, Carex Thunbeigit, Carex curvicollis Carex dispalata, Scirpus triqueter, Scripus triangulatus, Osmunda cinnamomea, Impatieus noli-tangere, Senecio pierotii, Lythrum anceps, Iris setosa, Phragmites communis, Zizania latifolia, Typha latifolia, Sparganium stoloniferum, Scirpus lacustris L., Nuphar japonicum, Nelumbo nucifera, Acorus calamus L., Iris pseudoacorus L., Meryanthes trifoliata, Trapa natans, Nymphoides peltata, Nymphoides indica, Nymphaea tetragona, Potamogeton destinctus, Euryale ferox, Brasenia Scheberi, Hydrocharis Morsus-ranae, Potamogeton crispus, Potamogeton malaianus, Potamogeton octandrus, Ophiopogon japonicum, Mynophyllum verticillatum, Ranunculus aquatilis, Najas marina, Vallisneria asiatica, Hydrilla verticilleta*, Mimosa) was dissolved with 5–150 ppm concentration. Prawn and juvenile accelerated their growth and healthy prawn was harvested succesively.

EXAMPLE 8

Formulated concentrate of the water purificant was prepared by mixing with 10% of bittern concentrated from deep marine water, and 2% of mineral acids. The solution was diluted 1000–10000 folds and added into prawn culture pond. Then cells of Actinomycetes (*Actinomyces longisporus, Actinomyces longissimus, Actinomyces thermoviolaceus, Dactinosporungium thailandense, Dactinosporungium aurantiacum, Streptomyces aureus, Thermoactinomyces vulgaris, Thermoactinomyces monospora, Micropolyspora thermovirida, Nocardia vaccinii*) were sprayed on the prawn culture pond. The minerals of the water purificant coagulated algae, organic matters, sludges and soils, accelerated the growth of Actinomyces and healthy food chain in culture pond structured continuously with assistance of aeration and immobilization of microorganisms. The same procedure was effective for purification of bath water or pools.

EXAMPLE 9

Formulated concentrate of the water purificant was prepared by mixing with 10% of bittern concentrated from deep marine water or upwelling, 1% of aluminum chloride, 1% of ferric chloride and 2% of mineral acids. The solution was diluted 1000–10000 folds and introduced into lake water. Algae, organic matters, suspended soils, sludges and metal ion were coagulated effectively and transparency was improved.

EXAMPLE 10

Formulated concentrate of the water purificant was prepared by mixing with 3% of bittern, 1% of 1N sodium hydroxide, 1% aluminum chloride and 1% of ferric chloride. The solution was diluted 1000–10000 folds and added in the water supplying tank, cooling tower and humidifier. After then, 80% of the growth of legionnaires inhibited.

EXAMPLE 11

Formulated concentrate of the water purificant was prepared by mixing with 10% of bittern and 1% of 1N sodium hydroxide. The solution was diluted 1000–10000 folds and added in paddy field. Generally, phototrophic bacteria eliminate hazardous compounds for roots of rice and activate resiratory and metabolic system in roots. So additional spraying of phototrophic bacteria (*Chromatium okenii, Thioshirillum jenense, Thiobacillus perometabolis, Thiobacillus rubellus*) accelerated the growth of roots. The paddy fields using the water purificant of this invention should not flow out the reserved water for protection of flowing out phototrophic bacteria. In the stopped flow-paddy fields, healthy food chain was constructed continuously and healthy rice was harvested with 25% yield-up comparing to the control. The harvested rice was enhanced and tasty particle and kept life. In the case of additional spraying of boiled aquious extract or dried-up powder of water-front plants (*Salix subfragilis, Alnus japonica, Ulmus Davidiana, Acer palmatum thunb, Fraxinus mandshurica, Juglans mandshurica, Ilex serrato, Viburnum Opulus L., Hydrangea paniculata, Staphylea Bumald, Carex Thunbeigit, Carex curvicollis Carex dispalata, Scirpus triqueter, Scripus triangulatus, Osmunda cinnamomea, Impatieus noli-tangere, Senecio pierotii, Lythrum anceps, Iris setosa, Phragmites communis, Zizania latifolia, Typha latifolia, Sparganium stoloniferum, Scirpus lacustris L., Nuphar japonicum, Nelumbo nucifera, Acorus calamus L., Iris pseudoacorus L., Meryanthes trifoliata, Trapa natans, Nymphoides peltata, Nymphoides indica, Nymphaea tetragona, Potamogeton destinctus, Euryale ferox, Brasenia Scheberi, Hydrocharis Morsus-ranae, Potamogeton crispus, Potamogeton malaianus, Potamogeton octandrus, Ophiopogon japonicum, Mynophyllum verticillatum, Ranunculus aquatilis, Najas marina, Vallisneria asiatica, Hydrilla verticilleta*, Mimosa) in the concentration of 1–200 ppm, the growth of the phototrophic bacteria and the roots of rice was accelerated. The food chain in paddy fields was constructed strongly and microfauna distributed healthy. These environment foreshorten the cultivation period until harvest. The pH6.0–7.9 range of the reserved water in paddy fields is optimal. When pH of paddy field was in alkaline range, the water purificant of this invention should be prepared with addition of acids instead of bases or salts.

EXAMPLE 12

Generally, life transportation of prawns (Penaeus sp.) from eastern Asia to Japan was not actualized yet.

Formulated concentrate of the water purificant was prepared by mixing with 10% of bittern and 0.5% of mineral acids. The solution was diluted 1000–10000 folds and added to sawdust in which packed life and naked prawns. The life transportation of prawns using the water purificant of this invention was succeeded.

In the case of additional spraying of boiled aquious extract or dried-up powder of water-front plants (*Salix subfragilis, Alnus japonica, Ulmus Davidiana, Acer palmatum thunb, Fraxinus mandshurica, Juglans mandshurica, Ilex serrato, Viburnum Opulus L., Hydrangea paniculata, Staphylea Bumald, Carex Thunbeigit, Carex curvicollis Carex dispalata, Scirpus triqueter, Scripus triangulatus, Osmunda cinnamomea, Impatieus noli-tangere, Senecio pierotii, Lythrum anceps, Iris setosa, Phragmites communis, Zizania latifolia, Typha latifolia, Sparganium stoloniferum, Scirpus lacustris L., Nuphar japonicum, Nelumbo nucifera, Acorus calamus L., Iris pseudoacorus L., Meryanthes trifoliata, Trapa natans, Nymphoides peltata, Nymphoides indica, Nymphaea tetragona, Potamogeton destinctus, Euryale ferox, Brasenia Scheberi, Hydrocharis Morsusranae, Potamogeton crispus, Potamogeton malaianus, Potamogeton octandrus, Ophiopogon japonicum, Mynophyllum verticillatum, Ranunculus aquatilis, Najas marina, Vallisneria asiatica, Hydrilla verticilleta*, Mimosa) in the concentration of 1–200 ppm, the residual rate of life transportation of prawn (Peneaous sp.) was improved.

Formulated concentrate of the water purificant was prepared by mixing with 10% of bittern and 0.5% of mineral acids. The solution was diluted 1000–10000 folds, added to reservoir of living prawn for assimilation and then the residual rate (97%) of prawns was improved. Optimal pH range of life transportation in sawdust is pH6.2–7.8. The water purificant of this invention should be prepared with acids or bases in the range of pH 6.2–7.8. Addition of chitins, chitosans or their derivatives improved the residual rate of prawn also.

EXAMPLE 13

Formulated concentrate of the water purificant was prepared by mixing with 10% of bittern and 2% of mineral acids. The solution was diluted 1000–10000 folds, added to ponds or lakes contaminated with algae, organic matters, suspended soils, sludges and metal ions. After 1–3 hr, algae, organic matters, suspended soils, sludges and metal ions were coagulated and transparency of water improved from 5 cm to 70 cm. When yeast (*Saccharomyces carisbergensis, Saccharomyces cerevisiae, Zygosaccharomyces acidifaciens*) was added with the water pulificant of this invention to pond water, algae, organic matters, suspended soils, sludges and metal ions coagulated mildly and transparency of water was improved. Generally, yeast adsorbs anion. In pond water yeast can not proliferate without immobilization, so improvement of transparency is temporal. For continuous improvement of water quality, Actinomycetes (*Actinomyces longisporus, Actinomyces longissimus, Actinomyces thermoviolaceus, Dactinosporungium thailandense, Dactinosporungium aurantiacum, Streptomyces aureus, Thermoactinomyces vulgaris, Thermoactinomyces monospora, Micropolyspora thermovirida, Norcardia vaccinii*) should be added with the water purificant to the pond water. Minerals and yeast eliminate algae, organic matters, suspended soils, sludges and metal ions with coagulation and then growth of Actinomycetes constract food chain in pond water continuously. For continuous food chain formation, aeration and immobilization of microorganisms such as Actinomycetes are effective.

What is claimed is:

1. A water purificant for aquiculture, horticulture, floriculture and waste-water treatment, comprising a mixed solution that includes bittern and acids and/or salts, wherein the bittern concentration is 1 ppm–100 weight % and wherein said bittern is made from deep marine water that exists at more than 200 m. below the sea level.

2. A water purificant for aquiculture, horticulture, floriculture and waste-water treatment as defined in claim 1, wherein said bittern has a specific gravity in the range of from 1.2 to 1.4.

3. A water purificant for aquiculture, horticulture, floriculture and waste-water treatment as defined in claim 2, wherein the relative concentrations of bittern and acids and/or salts range from 5–80% for bittern and from 10–50% for acids and/or salts.

4. A water purificant for aquiculture, horticulture, floriculture and waste-water treatment as defined in claim 1, including the addition to said mixed solution of a boiled aqueous extract or dried-up powder of water front plants.

5. A water purificant for aquiculture, horticulture, floriculture and waste-water treatment as defined in claim 4, wherein said water front plants are from a group that includes *Salix subfragilis, Alnus japonica, Ulmus Davidiana, Acer palmatum thunb, Fraxinus mandshurica, Juglans mandshurica, Ilex serrato, Viburnum Opulus L., Hydrangea paniculata, Staphylea Bumald, Carex Thunbeigit, Carex curvicollis Carex dispalata, Scirpus triqueter, Scripus triangulatus, Osmunda cinnamomea, Impatieus noli-tangere, Senecio pierotii, Lythrum anceps, Iris setosa, Phragmites communis, Zizania latifolia, Typha latifolia, Sparganium stoloniferum, Scirpus lacustris L., Nuphar japonicum, Nelumbo nucifera, Acorus calamus L., Iris pseudoacorus L., Meryanthes trifoliata, Trapa natans, Nymphoides peltata, Nymphoides indica, Nymphaea tetragona, Potamogeton destinctus, Euryale ferox, Brasenia Scheberi, Hydrocharis Morsus-ranae, Potamogeton crispus, Potamogeton malaianus, Potamogeton octandrus, Ophiopogon japonicum, Mynophyllum verticillatum, Ranunculus aquatilis, Najas marina, Vallisneria asiatica, Hydrilla verticilleta*, and Mimosa.

6. A water purificant for aquiculture, horticulture, floriculture and waste-water treatment as defined in claim 1, wherein said solution includes bittern and mixed mineral acids with relative concentrations of 10% for bittern and 2% for said mixed mineral acids.

7. A water purificant for aquiculture, horticulture, floriculture and waste-water treatment as defined in claim 1, including the addition of sulphate to said mixed solution for water conditioning.

8. A water purificant for aquiculture, horticulture, floriculture and waste-water treatment as defined in claim 1, including the addition of phosphate, citrate and/or succinate to said solution for promoting growth of microorganisms, fishes and plants.

9. A water purificant for aquiculture, horticulture, floriculture and waste-water treatment as defined in claim 1, further comprising 10–20000 ppm of chitins or chitosans.

* * * * *